(12) United States Patent
Yamaguchi et al.

(10) Patent No.: US 7,957,119 B2
(45) Date of Patent: *Jun. 7, 2011

(54) METAL FILMS, METHODS FOR PRODUCTION THEREOF, METHODS FOR PRODUCTION OF LAMINATED ELECTRONIC COMPONENTS, AND LAMINATED ELECTRONIC COMPONENTS

(75) Inventors: Katsuyoshi Yamaguchi, Kirishima (JP); Koshiro Sugimoto, Kirishima (JP)

(73) Assignee: Kyocera Corporation, Kyoto (JP)

( * ) Notice: Subject to any disclaimer, the term of this patent is extended or adjusted under 35 U.S.C. 154(b) by 38 days.

This patent is subject to a terminal disclaimer.

(21) Appl. No.: 12/065,482

(22) PCT Filed: Aug. 21, 2006

(86) PCT No.: PCT/JP2006/316321
§ 371 (c)(1),
(2), (4) Date: Mar. 24, 2009

(87) PCT Pub. No.: WO2007/026562
PCT Pub. Date: Mar. 8, 2007

(65) Prior Publication Data
US 2010/0003475 A1    Jan. 7, 2010

(30) Foreign Application Priority Data
Aug. 29, 2005   (JP) ................................ 2005-248411

(51) Int. Cl.
*H01G 4/008* (2006.01)
(52) U.S. Cl. ...................... 361/305; 428/697; 361/306.1
(58) Field of Classification Search .................. 361/321, 361/306.1, 305; 428/697
See application file for complete search history.

(56) References Cited

U.S. PATENT DOCUMENTS

| | | | | |
|---|---|---|---|---|
| 5,097,391 | A | * | 3/1992 | Nomura et al. ............ 361/321.4 |
| 6,099,624 | A | | 8/2000 | Martyak ...................... 106/1.27 |
| 7,158,364 | B2 | * | 1/2007 | Miyauchi et al. ............. 361/303 |
| 7,224,570 | B2 | * | 5/2007 | Yamaguchi et al. .......... 361/305 |

FOREIGN PATENT DOCUMENTS

| | | |
|---|---|---|
| JP | 04-009492 | 1/1992 |
| JP | 2000-243650 | 9/2000 |
| JP | 2002-329634 | 11/2002 |
| JP | 2003-309037 | 10/2003 |

* cited by examiner

*Primary Examiner* — Cathy Lam
(74) *Attorney, Agent, or Firm* — DLA Piper LLP (US)

(57) ABSTRACT

A metal film containing Ni as a main component and Mn and at least one element selected from the group consisting of the elements of Groups 3b, 4b, 5b, and 6b of the periodic table includes a central part and a peripheral part in which Mn and the element selected from the group consisting of the elements of Groups 3b, 4b, 5b, and 6b of the periodic table are present in a concentration higher in the peripheral part than that in the central part. The metal film used as a conductor layer can have an increased melting point at the peripheral part and thus can be prevented from shrinking during heating. The metal film used as a conductor layer in electronic components and the like can be prevented from plastically deforming or shrinking during heating so that the conductor layer can have a large effective area and high adhesion to ceramic layers.

9 Claims, 3 Drawing Sheets 5 (M1 and M2 are present in high concentration.)

METAL FILMS, METHODS FOR PRODUCTION THEREOF, METHODS FOR PRODUCTION OF LAMINATED ELECTRONIC COMPONENTS, AND LAMINATED ELECTRONIC COMPONENTS

TECHNICAL FIELD

The invention relates to metal films, methods for production thereof, methods for production of laminated electronic components, and laminated electronic components. In particular, the invention relates to a metal film mainly composed of Ni, a method for producing such a metal film, a method for producing a laminated electronic component using such a metal film as a conductor layer, and such a laminated electronic component.

BACKGROUND ART

In recent years, laminated ceramic capacitors, representing laminated electronic components, have been designed to have thin dielectric ceramic layers and thin internal electrode layers to meet demands for smaller size and higher capacitance. For example, there are proposed a method of forming a patterned conductor (for serving as an internal electrode layer) on a film by a physical thin film forming method such as sputtering and vapor deposition or by a chemical thin film forming method such as electroless plating (see for example Patent Document 1 listed below) and another method suitable for mass production including forming a patterned conductor by an electroplating method using a nickel electrolyte or the like (see for example Patent Document 2 listed below).

Recently, it has also been disclosed that an additive such as sulfur is added to a Ni plating pattern so that the following capability of the plating film on a ceramic layer can be increased and that the adhesion between the layers can also be increased (see for example Patent Document 3 listed below).

Patent Document 1: Japanese Unexamined Patent Publication No. 2000-243650
Patent Document 2: Japanese Unexamined Patent Publication No. 2002-329634
Patent Document 3: Japanese Unexamined Patent Publication No. 2003-309037

DISCLOSURE OF THE INVENTION

Problems to be Solved by the Invention

Patterned thin conductors can be easily formed by the methods described above. Among such thin films, in particular, plating films obtained by electroplating may form conductor layers containing segregated intermetallic compounds such as $Ni_3S_2$, which has a melting point of 640° C. and hardly forms a solid solution with Ni, after baking, when sulfur or the like is added to the plating films.

FIG. 5 is a schematic diagram showing the internal structure of a laminated electronic component using conventional metal films as conductor layers. In FIG. 5, the cross-section of a rectangular parallelepiped-shaped laminated electronic component is perpendicular to the direction of an external electrode opposed thereto. When such metal films containing a segregated intermetallic compound such as $Ni_3S_2$ are used as patterned conductors, the end portion of the conductor layer 55 formed in the interior of the laminated ceramic capacitor can shrink so that a void 59 can be easily formed between the edge and the ceramic layer 57 as shown in FIG. 5. Such a void causes a problem in which a thermal shock resistance test becomes unreliable.

If the laminated ceramic capacitor having the patterned conductor described above is produced using a laboratory-scale furnace with almost no temperature distribution, even thin conductor layers can be prevented from forming structural defects such as the discontinuous conductor layer described above. However, when simultaneous large-scale firing is performed using an industrial furnace for large-scale production, such as a continuous tunnel furnace, in which the temperature difference is larger than that in the laboratory furnace, the end portion of the conductor layer fired in a region at a relatively high firing temperature can significantly shrink so that structural defects such as a discontinuous conductor layer and a void can be easily produced, although the shrinkage of the end portion of the conductor layer baked in a region at a relatively low baking temperature is slight. As a result, the effective area of the conductor layer is reduced so that the capacitance of the mass-produced laminated ceramic capacitors can be reduced.

It is therefore an object of the invention to provide a metal film that can prevent the formation of voids at the end portion of a conductor layer or prevent the formation of a discontinuous conductor pattern, even when a firing furnace for large-scale production is used. It is another object of the invention to provide a method for producing such a metal film, to provide a laminated electronic component produced with such a metal film, and to provide a method for producing such a laminated electronic component.

Means for Solving the Problems

As a result of investigations for solving the problems, the inventors have found a solution having the features described below and have completed the invention.

Thus, the invention is directed to (1) a metal film containing Ni as a main component and Mn and at least one element selected from the group consisting of the elements of Groups 3b, 4b, 5b, and 6b of the periodic table, which includes a central part and a peripheral part in which Mn and the element selected from the group consisting of the elements of Groups 3b, 4b, 5b, and 6b of the periodic table are present in a concentration higher in the peripheral part than that in the central part. (2) In the metal film, the total concentration of Mn and the element selected from the group consisting of the elements of Groups 3b to 6b of the periodic table in the peripheral part is preferably 1.05 to 3 times that in the central part. (3) The content of Mn in the metal film is preferably from $2 \times 10^{-1}$% by mass to 5% by mass. (4) The content of the element selected from the group consisting of the elements of Groups 3b to 6b in the metal film is preferably from $1 \times 10^{-1}$% by mass to $3 \times 10^{-1}$ by mass. (5) In the metal film, the element selected from the group consisting of the elements of Groups 3b to 6b is preferably selected from sulfur, boron and phosphorus.

A method for producing such a metal film includes the steps of (6) providing a Ni plating liquid containing Mn and at least one element selected from the group consisting of the elements of Groups 3b, 4b, 5b, and 6b of the periodic table; and plating a base material with Ni, Mn and the element selected from the group consisting of the elements of Groups 3b, 4b, 5b, and 6b of the periodic table at a current density of 4.5 to 20 A/dm², while using the Ni plating liquid. (7) In all the metal components of the Ni plating liquid, Mn preferably has a content of $2 \times 10^{-1}$ to 5% by mass, and the element selected from the group consisting of the elements of Groups 3b to 6b preferably has a content of $1 \times 10^{-1}$ to $3 \times 10^{-1}\%$ by mass.

The invention is also directed to (8) a method for producing a laminated electronic component with the metal film described above, which includes the steps of: transferring the metal film to a ceramic green sheet to form a patterned sheet comprising the ceramic green sheet and a patterned conductor provided thereon; laminating a plurality of pieces of the patterned sheet; and then firing the laminate. The invention is also directed to (9) the resulting laminated electronic component that includes an electronic component body including alternately laminated ceramic layers and conductor layers, wherein the conductor layers include the metal film described above.

Effects of the Invention

According to the invention, Mn and the element selected from the group consisting of the elements of Groups 3b to 6b of the periodic table coexist in the peripheral part of the metal film mainly composed of Ni, and Mn and the element in the peripheral part are segregated in a concentration higher than that in the central part, so that the peripheral part of the metal film can have a higher melting point and thus can be prevented from shrinking by heating.

Mn and the element selected from the group consisting of the elements of Groups 3b to 6b of the periodic table, which are segregated in the peripheral part of the metal film, can form intermetallic compounds. When used as a conductor layer in electronic components or the like, therefore, the metal film can be prevented from plastically deforming or shrinking by heating, so that the conductor layer can have an increased effective area and increased adhesion to ceramic layers.

When such a metal film is used as a conductor layer in a laminated electronic component, the shrinkage of the end portion of the conductor layer can be reduced, and the void between the conductor layer and a ceramic layer can also be reduced, so that the reliability of a thermal shock resistance test and the like can be improved.

If such a metal film is used to form laminated electronic components, firing-induced contraction variations in the contraction of a conductor layer can be prevented even in a mass-production furnace having variations in temperature, so that structural defects such as a discontinuity of conductor layer and a void can be prevented in the baked conductor layer and that laminated electronic components with high capacitance can be produced.

In the method for producing the metal film according to the invention, Mn and the element selected from the group consisting of the elements of Group 3b to 6b of the periodic table are added to a metal film mainly composed of Ni by electroplating from a Ni plating solution containing these elements. In this process, these elements can be easily segregated in the peripheral part of the plating film, as compared with the central part of the plating film.

DETAILED DESCRIPTION OF PREFERRED EMBODIMENT

Metal Film

Figure 1:
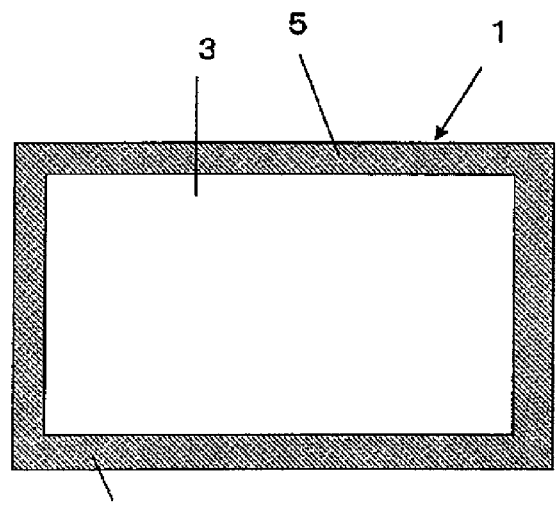
FIG. 1 is a plan view of a metal film according to one embodiment of the invention.

A description is given of the metal film of the invention. FIG. 1 is a plan view of a metal film according to one embodiment of the invention. A metal film 1 according to the invention contains Ni as a main component, Mn (M1) and at least one element (M2) selected from the group consisting of the elements of Groups 3b, 4b, 5b, and 6b of the periodic table.

The metal film 1 of the invention includes a central part 3 and a peripheral part 5 in which Mn (M1) and at least one element (M2, hereinafter also referred to as "S etc.") selected from the group consisting of the elements of Group 3b to 6b of the periodic table should be segregated in a concentration higher in the peripheral part 5 than that in the central part 3.

If the elements (M1 and M2) are not segregated in the peripheral part 5 of the metal film 1, the melting point of the peripheral part 5 cannot be increased so that it can be difficult to reduce heat-induced contraction.

In an embodiment of the invention, the state where the peripheral part 5 has Mn (M1) and S etc. (M2) segregated in a concentration higher than that in the central part 3 of the metal film 1 is intended to include the case that when the total concentration of Mn (M1) and S etc. (M2) is measured at four or more places in each of the central part 3 and the peripheral part 5, the ratio of (the average total concentration in the peripheral part)/(the average total concentration in the central part) is 1.05 or more. The peripheral part 5 may depend on the size of the metal film 1. For example, when the metal film 1 has a long side of 5 mm and a short side of 1.5 mm, the peripheral part 5 refers to, but not limited to, an area from the edge to 0.1 to 0.7 mm inside, preferably to 0.1 to 0.4 mm inside, and the central part 3 refers to the part surrounded by the peripheral part 5.

Specifically, in the metal film 1 of the invention, the total concentration of the additional elements Mn and S etc. in the peripheral part 5 is preferably 1.05 to 3 times that in the central part 3 on the same plane. If the total concentration of the additional elements Mn and S etc. in the peripheral part 5 is at least 1.05 times that in the central part 3, a difference can be made between the peripheral part 5 and the central part 3 with a lower content of the additional elements Mn and S etc. so that deformation of the peripheral part 5 of the metal film 1 formed by plating, which would otherwise easily form voids at the edge portion by firing-induced contraction, can be reduced.

If the total concentration of the additional elements Mn and S etc. in the peripheral part 5 is at most 3 times that in the central part 3, the rigidity of the peripheral part 5 can be close to that of the central part 3 in the metal film 1 mainly composed of Ni so that the following capability to materials to be bonded to the metal film 1 can be conserved and that the continuity between the central part 3 and the peripheral part 5 can be maintained in the metal film 1.

In the metal film 1 of the invention, the width of the peripheral part 5 where the elements M1 and M2 are segregated in a concentration higher than that in the central part 3 is preferably larger than the thickness of the metal film 1. If the width of the peripheral part 5 is larger than the thickness of the metal film 1, the effect of increasing the melting point by the high-additional-element-content layer of the peripheral part 5 can be advantageously enhanced.

In the metal film 1 of the invention, the area with a high concentration of the elements M1 and M2 may be almost entirely formed, while a portion is left for the central part 3. If the area with a high concentration of the elements M1 and M2 is formed almost over the metal film 1, the contraction of the metal film 1 by heating can be advantageously reduced over the metal film 1.

The content of Mn in the metal film 1 of the invention is preferably from $2 \times 10^{-1}$ to 5% by mass in terms of preventing the melting of the metal film 1 itself due to the generation of intermetallic compounds and ensuring the desired effective area.

If the content of Mn in the metal film 1 is $2 \times 10^{-1}$% by mass or more, the effect of the Mn addition for increasing the melting point of the Ni material can be enhanced so that heating-induced contraction can be advantageously reduced.

If the content of Mn in the metal film 1 is 5% by mass or less, the electrical conductivity of the metal film 1 mainly composed of Ni can be advantageously kept high, and the increase in rigidity by the addition of Mn can be kept at low level so that the following capability to materials to be bonded can be advantageously preserved.

The metal film 1 of the invention contains at least one element selected from the group consisting of the elements of Groups 3b, 4b, 5b, and 6b in a certain concentration. Examples of the symbols of elements include B, Al, Ga, and In for Group 3b of the periodic table; C, Si, Ge, Sn, and Pb for Group 4b; P, As, Sb, and Bi for Group 5b; and S, Se, Te, and Po for Group 6b.

Any element belonging to Groups 3b to 6b and capable of being dissolved in a plating bath may be used. At least one of sulfur (S), boron (B) and phosphorus (P) is preferred, because their solid solution less affects the properties of ceramic layers. Sulfur (S) is particularly preferred, because fluctuations in the pH or ion concentration of Ni-containing plating baths can be kept at low level even when the element belonging to Groups 3b to 6b is added.

When the element selected from the group consisting of the elements of Groups 3b to 6b is added to the metal film 1 mainly composed of Ni in addition to Mn, an intermetallic compound of high melting point can be formed between Mn and the element selected from the group consisting of the elements of Groups 3b to 6b so that the melting point of the metal film 1 can be increased.

The content of the element selected from the group consisting of the elements of Groups 3b to 6b in the metal film 1 is preferably from $1 \times 10^{-1}$ to $3 \times 10^{-1}$% by mass in terms of preventing the melting of the metal film 1 itself due to the generation of intermetallic compounds and ensuring the desired effective area. If the content of the element selected from the group consisting of the elements of Groups 3b to 6b in the metal film 1 is $1 \times 10^{-1}$% by mass or more, the element can be dispersed over the metal film 1 so that an alloy can be formed in a larger area to be effective in forming a stronger bonding portion.

If the content of the element selected from the group consisting of the elements of Groups 3b to 6b is $3 \times 10^{-1}$% by mass or less, the electrical conductivity of the metal film 1 mainly composed of Ni can be kept high, and the increase in rigidity can be kept at low level so that the following capability to materials to be bonded can be preserved, similarly to the case of Mn.

The metal film 1 of the invention is useful as a conductor layer for electronic components and circuit boards having insulating layers of ceramics or organic resin. In particular, the formation of voids can be prevented between the metal film 1 of the invention and insulating layers so that a high level of adhesion can be provided after heating. Therefore, the thickness of the metal film is preferably such that the step between an insulating layer and the metal film formed thereon can be kept small. Particularly for laminated ceramic capacitors having hundreds of stacked layers, the thickness of the metal film is preferably 1 μm or less and preferably has a lower limit of 0.1 μm or more so that the formation of discontinuous layers by firing-induced contraction can be prevented even after heating.

The metal components of the metal film 1 of the invention may be quantitatively analyzed and evaluated by ICP mass spectrometry (ICP-MS) after the metal film 1 is dissolved in an acid or the like.

The distribution of Mn and the element selected from the group consisting of the elements of Group 3b to 6b of the periodic table in the metal film 1 may be analyzed using a time-of-flight secondary ion mass spectrometer (TOF-SIMS). The thickness of the metal film 1 may be analyzed using an electron micrograph of the cross-section of the metal film 1.

Methods for Producing the Metal Film

Figure 2:
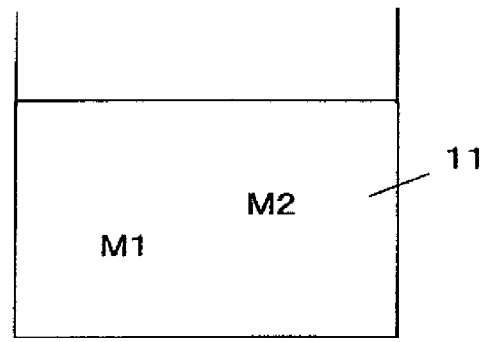
FIG. 2 is a schematic diagram showing a Ni plating bath for use in producing the metal film according to one embodiment of the invention.
Figure 2:
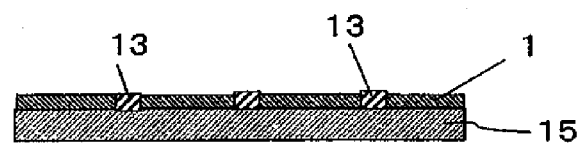

Methods for producing the metal film 1 of the invention are described below. FIG. 2 is a schematic diagram showing a Ni plating bath for use in forming the metal film 1 of the invention. In a production method according to the invention, a Ni plating solution 11 is first prepared that contains Mn (M1) and at least one element (M2) selected from the group consisting of the elements of Group 3b to 6b of the periodic table.

Using the Ni plating solution 11, Ni, Mn and the element selected from the group consisting of the elements of Groups 3b to 6b of the periodic table are then deposited by electroplating on a metal member 15 of stainless steel, a plated iron material or the like provided with a patterned resist 13, while the applied voltage and the energization time are controlled, so that the metal film 1 of the invention is formed thereon in such a manner that the additional elements Mn and S etc. are segregated at a relatively high concentration in the peripheral part 5.

In this process, the plating conditions should include a current density of 4.5 to 20 A/dm$^2$. In the range of 4.5 to 20 A/dm$^2$, the current density is particularly set in the range of 5.5 to 15 A/dm$^2$ so that Mn and the element selected from the group consisting of the elements of Groups 3b to 6b of the periodic table can be deposited at the same time and that the ratio of the total concentration of Mn and the element selected from the group consisting of the elements of Groups 3b to 6b of the periodic table in the peripheral part 5 to that in the central part 3 can be adjusted to 1.3 to 4. If the ratio of the total concentration in the peripheral part 5 to that in the central part 3 is in the range of 1.3 to 4 in the metal film 1, the effective area of the metal film 1 can be kept large after firing, and a high capacitance can be provided.

In the production method according to the invention, each of the additional elements of Groups 3b to 6b should have a proper range in order to form a plating film of high crystallinity and high purity. A sulfur-containing Ni plating bath preferably has a pH in the range of 3.5 to 5.

The plating film mainly composed of Ni and formed on the metal member 15 is then transferred to a base material such as a pressure-sensitive adhesive-coated organic resin sheet of polyimide, polyester or the like. The metal film 1 of the invention may be stored in this state.

Methods for Producing Laminated Electronic Components

Figure 3:
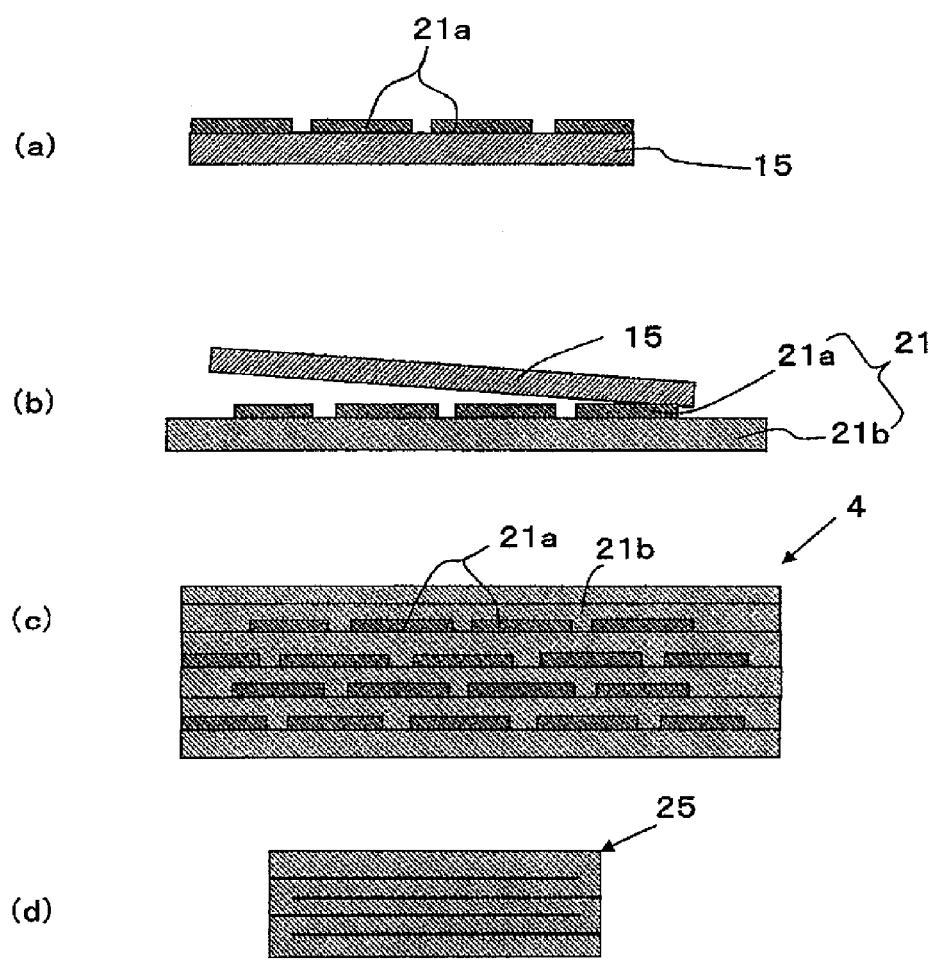
FIG. 3 is a diagram showing a process for manufacturing a laminated ceramic capacitor according to one embodiment of the invention.

A description is given below of methods for producing electronic components according to the invention. FIG. 3 is a diagram of a process for manufacturing a laminated ceramic capacitor as an example of the laminated electronic component of the invention.

(a) First, the metal film 21a prepared by the production method described above is provided. (b) The metal film 21a is transferred onto a ceramic green sheet 21b to form a patterned sheet 21. The dielectric material that forms the ceramic green sheet 21b preferably includes barium titanate as a main component in order to have a high dielectric constant. The dielectric material preferably contains various additives or glass components so as to have increased dielectric characteristics and sinterability. In terms of producing high capacitance, the ceramic green sheet 21b preferably has a thickness of 3 μm or less and preferably forms a dielectric layer with a thickness of 2 μm or less after baking.

(c) A plurality of patterned sheets 21 are then laminated so that a formed laminate 25 is prepared. (d) The formed laminate 25 is then cut in a grid pattern so that shaped electronic component bodies are prepared. In the shaped electronic component green body, the sheets are laminated in such a manner that the metal film 21a is exposed at one end of every other layer. The shaped electronic component green body is then fired to form an electronic component body.

As described above, the metal film 21a according to the invention contains Ni as a main component and Mn and at least one element selected from the group consisting of the elements of Groups 3b to 6b of the periodic table. Particularly, the metal film 21a of the invention includes a central part 3 and a peripheral part 5 in which Mn and the element selected from the group consisting of the elements of Groups 3b to 6b of the periodic table are segregated in a concentration higher in the peripheral part 5 than that in the central part 3.

When the metal film 21a and the ceramic green sheet 21b are baked at the same time in the production method as described above, the elements Mn and S etc., which have been segregated in the peripheral part 5 in a concentration higher than that in the central part 3 before firing, are further segregated in the peripheral part 5 by the firing so that the high-melting-point area of the peripheral part 5 can be expanded in the metal film 21a. The high-melting-point area can be expanded not only in the peripheral part 5 but also in the surface side. Therefore, the additional elements present in the peripheral part 5 and the surface side of the metal film 21a can further increase the adhesion to the adjacent ceramic layer.

Intermetallic compounds are formed in the metal film 21a of the invention and in the fired metal film (conductor layer) 21a. When the metal film contains Mn and sulfur (S), for example, intermetallic compounds are formed between Ni metal (the main component of the plating film) and any of Mn and S etc. in a dispersed manner. In this case, the intermetallic compounds can be easily combined with the component of the ceramic layer at the interface between the conductor layer and the ceramic layer as compared with a simple Ni metal material, so that the bonding between the conductor layer and the ceramic layer can be enhanced.

Laminated Electronic Components

Figure 4:
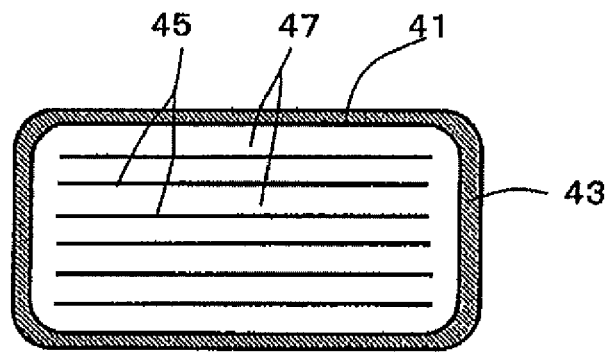
FIG. 4 is a schematic cross-sectional view of a laminated electronic component according to one embodiment of the invention.
Figure 5:
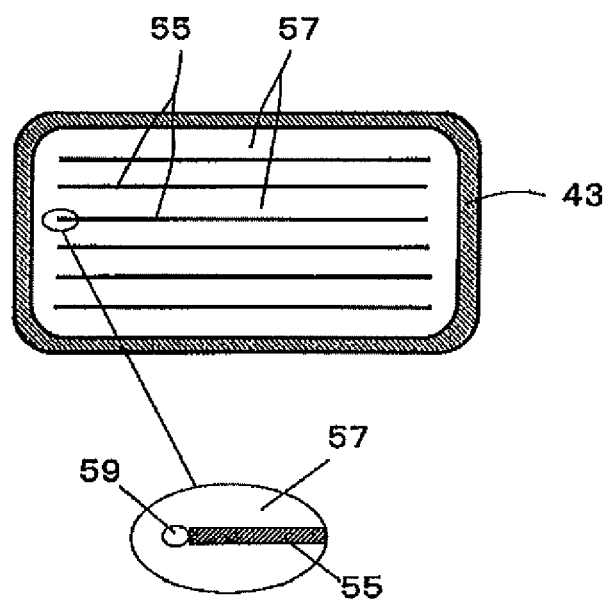
FIG. 5 is a schematic diagram showing the internal structure of a laminated electronic component using conventional metal films as conductor layers.

FIG. 4 is a schematic cross-sectional view of a laminated ceramic capacitor as an example of the laminated electronic component of the invention. In FIG. 4, the cross-section of a rectangular parallelepiped-shaped laminated electronic component is perpendicular to the direction of an external electrode opposed thereto. Referring to FIG. 4, the laminated ceramic capacitor according to an embodiment of the invention includes a rectangular parallelepiped-shaped electronic component body 41 and external electrodes 43 formed at both ends of the electronic component body 41. The electronic component body 41 includes alternately laminated conductor layers 45 and ceramic layers 47.

The conductor layers 45 are alternately exposed at each of the end faces opposite to the electronic component body 41 and alternately electrically-connected to each of the external electrodes 43. In the laminated electronic component according to an embodiment of the invention, the conductor layers 45 each include Ni as a main component and Mn and at least one element selected from the group consisting of the elements of Groups 3b to 6b of the periodic table, in which the concentration of Mn and the element selected from the group is higher in the peripheral part 5 than in the central part 3, so that the formation of voids can be prevented at the end portions of the conductor layers 45 and that the occurrence of discontinuous portions can also be prevented in the patterned conductors. Even when a baking furnace for large-scale production is used, variations in the contraction of the metal films 21a can be reduced so that variations in the effective area of the conductor layers 45 can also be reduced.

In an embodiment of the invention, the conductor layer 45 containing Mn and the ceramic layer 47 containing Si may form a complex Mn—Si oxide at the interface between the conductor layer 45 and the ceramic layer 47. The complex oxide can further increase the adhesion between the layers and thus can increase the thermal shock resistance.

Example 1

Concerning the metal film 21a and the laminated electronic component of the invention, a laminated ceramic capacitor was prepared and evaluated. A mirror-finished stainless steel base plate was used. A photosensitive resist resin was applied to the surface of the base plate and patterned. In the resulting patterned resist, rectangular patterns were placed in a staggered arrangement. The size of one of the patterns was 5 mm in long side and 1.5 mm in short side.

Electroplating was then performed using a Ni plating solution 11 containing Mn and at least one element selected from the group consisting of the elements of Groups 3b to 6b of the periodic table so that a 0.3 μm-thick Ni plating film containing each of the additional elements in a specific content was formed on the stainless steel base plate.

In this process, for example, the plating bath was a solution containing Groups 3b to 6b element sulfate ions and containing manganese sulfate as a Mn source and used in combination with a Ni anode, when the electroplating was performed. The concentration of each element in the metal film 21a was controlled by modifying the concentration of the element in the plating bath and the current density for the plating.

A dielectric powder mainly composed of $BaTiO_3$ was then mixed with specific amounts of an organic binding agent, a plasticizer, a dispersing agent, and a solvent. The mixture was ground and kneaded with a vibrating mill to give a slurry. The slurry was then applied to a polyester carrier film with a die coater to form a 2.4 μm-thick ceramic green sheet.

The metal film 21a mainly composed of Ni was then placed on the ceramic green sheet 21b and transferred thereto by thermal compression bonding under the conditions of 80° C. and 80 kg/cm$^2$ so that a patterned sheet 21 having the transferred patterned conductor was prepared.

Two hundred pieces of the patterned sheet 21 were then laminated and pressed under the conditions of a temperature of 100° C. and a pressure of 200 kgf/cm$^2$ so that a formed laminate was prepared.

The formed laminate was then cut in a grid pattern to give formed electronic component green bodies. The formed electronic component bodies were subjected to a debinding process in a non-oxidative atmosphere at 300° C. to 500° C. and then fired at 1170° C. for 2 hours in the same atmosphere, resulting in electronic component bodies.

In the final process, a glass power-containing Cu paste was applied to each end of the resulting electronic component body, at which the conductor layers 45 were exposed, and then baked in a nitrogen atmosphere. A Ni plating film and a Sn plating film were formed on the surface of each resulting external electrode 43 so that a laminated ceramic capacitor having the external electrodes 43 electrically connected to the internal electrode layers was prepared.

The outside dimensions of the resulting laminated ceramic capacitor were 1.25 mm in width, 2.0 mm in length and 1.25 mm in thickness, and the dielectric layer interposed between the internal electrode layers had a thickness of 2 μm. The area ratio of the conductor layers 45 to the ceramic layers 47 was designed to be 70%.

Sample Nos. 1 to 10

When the laminated ceramic capacitor was prepared as described above, sulfur, boron or phosphorus was used as the metal film 21a was evaluated using the number of counts by TOF-SIMS. In this process, three pieces of the plating metal film 21a, 5 mm in long side, 1.5 mm in short side and 0.3 mm in thickness were selected. For each pattern, the evaluation was performed at any four places in the central part 3 of the surface of the metal film 21a, and the evaluation was also performed at one place (0.2 mm inside from the edge) in each of the four side portions of the peripheral part 5 (four places in total) of the same metal film 21a. For each part, the measurements were averaged, and the ratio of the concentration in the peripheral part 5 to the concentration in the central part 3 was calculated. When the concentration ratio was determined, each concentration used was the total concentration of Mn and the element selected from the group consisting of the elements of Groups 3b to 6b of the periodic table.

The content of each metal element in the metal film 21a was evaluated using ICP mass spectrometry (ICP-MS).

Capacitance Measurement

The initial capacitances (C) of 100 pieces of each laminated ceramic capacitor obtained after the baking were measured. The measurement was performed under the conditions of a reference temperature of 25° C., a frequency of 1.0 kHz and an input signal level of 0.5 Vrms. The target capacitance value was 4.7 μF.

Evaluation

Each laminated ceramic capacitor sample obtained as described above was subjected to a thermal shock resistance test and evaluated by determining the number of delaminations. In the thermal shock resistance test, the laminated ceramic capacitor sample was immersed in a solder bath at a temperature of 400° C., and the number of delaminations was determined. The results are shown in Table 1.

TABLE 1

| | | Metal film | | | | | Laminated electronic components | | |
| | | Plating conditions | | | | Ratio of | Ratio of | | Thermal shock resistance test (400° C.) |
| Sample No. | Current density (A/dm$^2$) | pH (—) | Elements of Groups 3b to 6b Element | % by mass | Mn % by mass | concentration (Peripheral part/ Central part) | concentration (Peripheral part/ Central part) | Capacitance (μF) | The number of delaminations (Quantity per 100 pieces) |
|---|---|---|---|---|---|---|---|---|---|
| * 1 | 20 | 4 | Sulfur | $5 \times 10^{-2}$ | 0 | 1.02 | 1.04 | 9.6 | 5 |
| * 2 | 3 | 4 | Sulfur | $1 \times 10^{-1}$ | $4 \times 10^{-4}$ | 1.00 | 1.03 | 9.0 | 4 |
| 3 | 4.5 | 4 | Sulfur | $5 \times 10^{-3}$ | $5 \times 10^{-1}$ | 1.05 | 1.08 | 9.7 | 1 |
| 4 | 5.5 | 4 | Sulfur | $1 \times 10^{-1}$ | $2 \times 10^{-1}$ | 1.30 | 1.30 | 9.8 | 0 |
| 5 | 10 | 4 | Sulfur | $2 \times 10^{-1}$ | 1 | 2.00 | 2.00 | 9.8 | 0 |
| 6 | 15 | 4 | Sulfur | $2 \times 10^{-1}$ | 5 | 4.00 | 4.00 | 9.8 | 0 |
| 7 | 20 | 4 | Sulfur | $3 \times 10^{-1}$ | 9 | 12.3 | 12.3 | 9.5 | 0 |
| * 8 | 30 | 4 | | | _Note)_ | | | | |
| 9 | 10 | 3 | Boron | $2 \times 10^{-1}$ | 1 | 2.00 | 2.00 | 9.7 | 0 |
| 10 | 15 | 1.3 | Phosphorus | 1 | 1 | 2.50 | 2.50 | 9.8 | 0 |

The samples marked "*" are out of the scope of the present invention.
_Note)_ No evaluation could be performed because the metal film was separated from the base material during the plating.

element selected from the group consisting of the elements of Groups 3b to 6b of the periodic table. The content of each of the element and Mn and the current density during the plating were set as shown in Table 1, when each of Sample Nos. 1 to 10 was prepared.

Concentration Measurement

The distribution of concentration of Mn and the element selected from the group consisting of the elements of Groups 5b to 6b of the periodic table in the resulting electroplating It is apparent from the results of Table 1 that the concentration of Mn and the element selected from the group consisting of the elements of Groups 3b to 6b of the periodic table segregated in the peripheral part 5 was higher than that in the central part 3, when the metal film was produced under the current density conditions according to the invention with a Ni plating solution that contained Mn and the element selected from the group consisting of the elements of Groups 3b to 6b of the periodic table according to the invention (Sample Nos. 3, 4, 5, 6, 7, 9, and 10). In Sample Nos. 3 to 7, 9 and 10 each using the metal film 21a, no void was observed at the end portions of the conductor layers 45 in the cross-section of the laminated ceramic capacitor, a capacitance of at least 9.5 µF was achieved, and the number of delaminations was one or less per 100 pieces in the thermal shock resistance test, so that good results were obtained.

In contrast, the capacitance value after the baking was low, or the number of delaminations was 4 or more per 100 pieces in the thermal shock resistance test, with respect to Sample No. 1 (in which the Ni plating film was free of Mn) and Sample No. 2 (in which there was no difference in concentration between the central part 3 and the peripheral part 4 of the metal film 21a, although the metal film 21a contained Mn and sulfur). In Sample No. 8 with a current density of 30 A/dm$^2$, the metal film 21a was separated from the base material during the plating, so that no laminated ceramic capacitor was obtained.

Example 2

Samples were prepared using the process of Example 1 and the structure of the laminated ceramic capacitors of Sample Nos. 2 to 7, except that the baking was performed in the baking temperature range shown in Table 2. The samples were evaluated in the same way. The results are shown in Table 2.

TABLE 2

| Sample No. | Sample No. in Example 1 | Baking temperature (° C.) | Capacitance (µF) | Thermal shock resistance test (400° C.) The number of delaminations (Quantity per 100 pieces) |
|---|---|---|---|---|
| * 11 | 2 | 1150 | 8.9 | 6 |
|  |  | 1170 | 9 | 4 |
|  |  | 1200 | 8.9 | 4 |
| 12 | 3 | 1150 | 9.6 | 1 |
|  |  | 1170 | 9.7 | 1 |
|  |  | 1200 | 9.6 | 1 |
| 13 | 4 | 1150 | 9.8 | 1 |
|  |  | 1170 | 9.8 | 0 |
|  |  | 1200 | 9.8 | 0 |
| 14 | 5 | 1150 | 9.8 | 0 |
|  |  | 1170 | 9.8 | 0 |
|  |  | 1200 | 9.8 | 0 |
| 15 | 6 | 1150 | 9.8 | 0 |
|  |  | 1170 | 9.8 | 0 |
|  |  | 1200 | 9.8 | 0 |
| 16 | 7 | 1150 | 9.4 | 0 |
|  |  | 1170 | 9.5 | 0 |
|  |  | 1200 | 9.5 | 0 |

The samples marked "*" are out of the scope of the present invention.

In Sample Nos. 12 to 16 each using the metal film 21a of the invention, the capacitance produced at a firing temperature of 1150 to 1200° C. was at a similar level to that at 1170° C., and the defective rate in the thermal shock resistance test was one or less per 100 pieces.

In Sample No. 11 using a composite metal powder departing from the scope of the invention, the capacitance was relatively low and at most 9 µF when the baking temperature was from 1150 to 1200° C., or the number of delaminations in the thermal shock resistance test was relatively large and varied with the baking temperature.

The invention claimed is:

1. A metal film, comprising:
   Ni;
   Mn; and
   at least one element selected from the group consisting of the elements of Groups 3b, 4b, 5b, and 6b of the periodic table,
   wherein a total concentration, expressed by mass %, of Mn and the at least one element in the peripheral part of the metal film is 1.05 to 3 times that in a central part of the metal film.

2. The metal film according to claim 1, wherein the at least one element is selected from sulfur, boron and phosphorus.

3. A laminated electronic component, comprising:
   an electronic component body comprising alternately laminated ceramic layers and conductor layers, each of the conductor layers comprising the metal film according to claim 1.

4. A metal film, comprising:
   Ni;
   Mn; and
   at least one element selected from the group consisting of the elements of Groups 3b, 4b, 5b, and 6b of the periodic table,
   wherein a total concentration, expressed by mass %, of Mn and the at least one element in a peripheral part of the metal film is higher than that in the central part of the metal film, and
   wherein a Mn content of the metal film overall is $2 \times 10^{-1}$% by mass to 5% by mass in the metal film.

5. The metal film according to claim 4, wherein the at least one element is selected from sulfur, boron and phosphorus.

6. A laminated electronic component, comprising:
   an electronic component body comprising alternately laminated ceramic layers and conductor layers, each of the conductor layers comprising the metal film according to claim 4.

7. A metal film, comprising:
   Ni;
   Mn; and
   at least one element selected from the group consisting of the elements of Groups 3b, 4b, 5b, and 6b of the periodic table, wherein a total concentration, expressed by mass %, of Mn and the at least one element in a peripheral part of the metal film is higher than that in a central part of the metal film, and wherein a content of the at least one element of the metal film overall is $1 \times 10^{-1}$% by mass to $3 \times 10^{-1}$% by mass in the metal film.

8. The metal film according to claim 7, wherein the at least one element is selected from sulfur, boron and phosphorus.

9. A laminated electronic component, comprising:

an electronic component body comprising alternately laminated ceramic layers and conductor layers, each of the conductor layers comprising the metal film according to claim 7.

* * * * *